(12) United States Patent  
Miyawaki et al.

(10) Patent No.: US 11,794,275 B2  
(45) Date of Patent: Oct. 24, 2023

(54) BONDING DEVICE AND BONDING METHOD FOR FRICTION STIR BONDING AND RESISTANCE WELDING

(71) Applicant: HONDA MOTOR CO., LTD., Tokyo (JP)

(72) Inventors: Akiyoshi Miyawaki, Saitama (JP); Mitsuru Sayama, Saitama (JP); Taichi Kurihara, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/861,819

(22) Filed: Jul. 11, 2022

(65) Prior Publication Data

US 2023/0019177 A1 Jan. 19, 2023

(30) Foreign Application Priority Data

Jul. 16, 2021 (JP) ................................. 2021-118230

(51) Int. Cl.
*B23K 20/00* (2006.01)
*B23K 20/12* (2006.01)
(Continued)

(52) U.S. Cl.
CPC .......... *B23K 20/1255* (2013.01); *B23K 11/11* (2013.01); *B23K 20/125* (2013.01); *B23K 20/1265* (2013.01); *B23K 2103/18* (2018.08)

(58) Field of Classification Search
CPC .. B23K 20/125; B23K 20/1265; B23K 28/02; B23K 20/1245; B23K 11/11; B23K 20/123; B23K 20/1255; B23K 20/122; B23K 20/126; B23K 2103/18; B23K 1/0008; B23K 11/16; B23K 20/1225; B23K 2101/12

See application file for complete search history.

(56) References Cited

U.S. PATENT DOCUMENTS

2004/0118899 A1* 6/2004 Aota .................. B23K 20/1255  
228/2.1  
2009/0090700 A1 4/2009 Sato et al.  
(Continued)

FOREIGN PATENT DOCUMENTS

JP 2004276724 A 10/2004  
JP 2005081375 A 3/2005  
(Continued)

OTHER PUBLICATIONS

Notice of Reasons for Refusal for Japanese Patent Application No. 2021-118230 dated Apr. 11, 2023; 6 pp.

*Primary Examiner* — Erin B Saad  
(74) *Attorney, Agent, or Firm* — Armstrong Teasdale LLP (57) ABSTRACT

A bonding device for joining together a first member (3), an intermediate member (4), and a second member (3) which are layered as a laminated assembly includes a probe (12, 41), an anvil (11, 11b, 11c, 11d), a shoulder member (13,13a, 61,64,68), a drive mechanism (14) configured to rotate the probe around the central axial line and move the probe toward and away from the second member along the central axial line, and an electric power supply (15) electrically connected to the anvil and the shoulder member to conduct electric current through the laminated assembly via the anvil and the shoulder member.

10 Claims, 7 Drawing Sheets

(51) Int. Cl.
 B23K 11/11 (2006.01)
 B23K 103/18 (2006.01)

(56) References Cited

U.S. PATENT DOCUMENTS

| | | | | |
|---|---|---|---|---|
| 2014/0261900 | A1* | 9/2014 | Maurer | C22F 3/00 |
| | | | | 148/512 |
| 2015/0375335 | A1* | 12/2015 | Liu | B23K 20/126 |
| | | | | 219/78.13 |
| 2016/0318120 | A1* | 11/2016 | Okada | B23K 20/126 |
| 2019/0143442 | A1* | 5/2019 | Ohashi | B23K 20/12 |
| | | | | 428/172 |
| 2022/0105588 | A1* | 4/2022 | Lacey | B23K 1/0008 |
| 2023/0013259 | A1* | 1/2023 | Miyawaki | B23K 28/02 |
| 2023/0014926 | A1* | 1/2023 | Miyawaki | B23K 11/115 |
| 2023/0019177 | A1* | 1/2023 | Miyawaki | B23K 20/125 |

FOREIGN PATENT DOCUMENTS

| | | | |
|---|---|---|---|
| JP | 2005111489 | A | 4/2005 |
| JP | 2007237253 | A | 9/2007 |
| JP | 2008030100 | A | 2/2008 |
| JP | 2020142251 | A | 9/2020 |

* cited by examiner

BONDING DEVICE AND BONDING METHOD FOR FRICTION STIR BONDING AND RESISTANCE WELDING

TECHNICAL FIELD

The present invention relates to a bonding device and a bonding method for friction stir bonding and resistance welding.

BACKGROUND ART

Resistance welding and friction stir bonding are known as environmentally friendly processes for joining a plurality of metallic plate members as these processes emit relatively small amounts of gases, and cause very little impact on air quality. In particular, friction stir bonding is preferred as this process requires a relatively small amount of electric power.

When joining three or more metallic plate members made of dissimilar material by resistance welding, an adhesive agent is often used in combination for the purpose of preventing electrolytic corrosion. However, it is difficult to prevent flaws which are intrinsic to the adhesive agent, and a stable bonding strength may not be maintained for a prolonged period of time without highly stringent precautionary measures. When a high level of reliability is required, rivets may have to be used in combination.

Friction stir bonding is suited for joining two metallic plate members made of dissimilar materials, but may not be suited for joining three or more metallic plate members because of a limited range of the material that is effectively stirred. For instance, when an aluminum plate member and a pair of steel plate members are to be joined by friction stir bonding, the upper two of the members (such as an aluminum plate member and a steel plate member) may be properly joined, but the third member or the lowermost layer may not be properly joined to the other two.

JP2005-111489A discloses a method for joining three or more metallic members including those made of dissimilar materials by combining two bonding techniques. According to this prior art, an aluminum member, a steel member and a clad member containing an aluminum layer and a steel layer are joined to one another by joining the aluminum member to the aluminum layer of the clad member by friction stir bonding, and joining the steel member and the steel layer of the clad member at the same time by using a thermosetting adhesive agent which is cured by the frictional heat of the friction stir bonding. However, this method requires the presence of a clad member in one of the members that are to be joined.

In the process disclosed in JP2007-237253A, a pair of members are abutted against each other, and joined to each other by friction stir bonding, and a third member is joined to the bonded part by using a fusion welding or resistance welding.

When three or more metallic members including those made of dissimilar materials, it is necessary to combine two or more different joining methods. According to the prior art, the entire joining process has to be performed in multiple steps, and two or more different joining devices have to be used with the result that the production line has to be extended, and a substantial amount of investment is required.

In view of such problems of the prior art, a primary object of the present invention is to provide a bonding device and a bonding method for joining three or more members including those made of dissimilar materials which allow the time required for the bonding process to be reduced, and the expenditure for the production facility to be reduced. The present invention may contribute to minimization of environmental impact on the air, and improvement in energy efficiency of the production facility.

SUMMARY OF THE INVENTION

To achieve such an object, one aspect of the present invention provides a bonding device (1) for joining together a first member (3), an intermediate member (4), and a second member (5) which are electroconductive, extend along a prescribed major plane, and are layered in this order as a laminated assembly (2), comprising: an anvil (11, 11b, 11c, 11d) configured to support a first surface of the laminated assembly provided by the first member, and including an electroconductive part abutting against the first surface; a probe (12, 41) configured to rotate around a central axial line crossing the major plane and move toward and away from a second surface (7) of the laminated assembly provided by the second member at a position corresponding to the anvil; a shoulder member (13,13a, 61,64,68) having a shoulder contact surface (24,24a) configured to be pressed against the second surface (7), and a thorough hole (20, 20a) configured to receive the probe, the shoulder member being at least partly electroconductive; a drive mechanism (14) configured to rotate the probe around the central axial line and move the probe toward and away from the second member along the central axial line; an electric power supply (15) electrically connected to the anvil and the shoulder member to conduct electric current through the laminated assembly via the anvil and the shoulder member; and a control unit (16) for controlling operation of the drive mechanism and the electric power supply such that the first member and the intermediate member are joined to each other by resistance welding and the second member and the intermediate member are joined to each other by friction stir bonding.

According to this aspect of the present invention, since the anvil and shoulder member used for friction stir bonding additionally serve as electrodes for resistance welding, the equipment cost can be reduced, the equipment size can be reduced, and the length of the production line can be reduced. Further, since friction stir bonding and resistance welding can be performed at the same time, the processing time can be reduced.

Preferably, the probe (41) includes an electrically conductive central part (42) and an electrically insulating outer sleeve (43) provided on an outer peripheral surface of the central part.

Since the probe may consist of an electrically conductive central part typically made of metallic member, and an electrically insulating outer sleeve, electric current is prevented from being conducted from the shoulder member to the probe, the bonding quality can be stabilized and improved, and the electrical safety of the equipment can be enhanced while the central part can be made of inexpensive material.

Preferably, the shoulder member (61, 64) includes a ring part (63, 67) surrounding the through hole (20) made of an electrically insulating material and an outer peripheral part (62, 66) made of electrically conductive material.

Thereby, the shoulder member can conduct electric current to the laminated assembly for resistance welding but not to the probe so that the bonding quality can be ensured and the electrical safety of the equipment can be enhanced.

Preferably, the shoulder member (64) includes an inner ring part (65) surrounding the through hole (20) and made of electrically conductive material, an outer ring part (67) surrounding the inner ring part and made of electrically insulating material, and an outer peripheral part (66) made of electrically conductive material.

Thereby, the shoulder member can conduct electric current to the laminated assembly for resistance welding but not to the probe so that the bonding quality can be ensured and the electrical safety of the equipment can be enhanced. Further, the part of the shoulder member which is in sliding contact with the probe can be made of inexpensive and durable material such as metallic material.

Preferably, the anvil (11) is provided with an anvil contact surface (17) configured to come into contact with the first surface (6) of the laminated assembly (2), and the anvil contact surface has an outer peripheral contour which is located radially outward of an inner peripheral contour of the shoulder contact surface.

Since the path of the electric current expands to a radially outer region so that the nugget can be extended in the radial outward direction, and the bonding strength between the first member and the intermediate member can be increased.

Another aspect of the present invention provides a bonding method for joining together a first member (3), an intermediate member (4), and a second member (3) which are electroconductive, extend along a prescribed major plane, and are layered in this order as a laminated assembly (2) by using the bonding device as defined above, comprising the steps of: abutting the anvil (11, 11b, 11c, 11d) against the first surface (6) of the laminated assembly (2), and the shoulder member (13, 13a, 61, 64, 68) against the second surface (6) of the laminated assembly (2); pushing the probe via the through hole of the shoulder member into the laminated assembly from the second surface while rotating the probe around the central axial line by using the drive mechanism to join the second member and the intermediate member to each other by friction stir bonding, and conducting electric current through the laminated assembly between the shoulder member and the anvil by using the electric power supply to join the first member and the intermediate member to each other by resistance welding; and pulling the probe away from the laminated assembly via the through hole, wherein the first member and the intermediate members are made of similar materials, and the second member is made of a material dissimilar from the materials of the first member and the intermediate member.

According to this aspect of the present invention, since the anvil and shoulder member used for friction stir bonding additionally serve as electrodes for resistance welding, the equipment cost can be reduced, the equipment size can be reduced, and the length of the production line can be reduced. Further, since friction stir bonding and resistance welding can be performed at the same time, the processing time can be reduced.

When dissimilar materials are resistance welded, highly brittle intermetallic compounds are often generated so that the desired bonding strength may not be achieved. However, according to this aspect of the present invention, the second member and the intermediate member are joined by friction stir bonding instead of resistance welding so that the bonding strength is prevented from being reduced by such intermetallic compounds.

Typically, materials of the first member and the intermediate member are higher in mechanical strength and electric resistance than the material of the second member. Members being made of similar materials as used herein mean that they are alloys whose main components are the same, and the members being made of dissimilar materials as used herein means that they are alloys whose main components are different.

Preferably, electric current is started to be supplied between the shoulder member and the anvil before the probe reaches the intermediate member.

Since the electric current supplied between the shoulder member and the anvil causes a comparatively large region of the laminated assembly to be softened, pushing the probe into the laminated assembly is facilitated, and the probe can be pushed into the laminated assembly at a faster rate.

Alternatively, electric current may be started to be supplied between the shoulder member and the anvil substantially simultaneously as or after the probe reaches the intermediate member.

Since the electric current soften the second member ranging from a part adjacent to the outer periphery of the probe (from which a hook starts to develop) to a part adjoining the shoulder member, the tip of the hook can be guided in a radially outer direction. Furthermore, the part of the intermediate member directly above the anvil is preferentially softened, and this further promotes the hook to be developed in a favorable manner.

Alternatively, electric current may be started to be supplied between the shoulder member and the anvil substantially simultaneously as or after the probe reaches the first member.

Thereby, the nugget can be formed in a ring shape in a stable manner so that the bonding strength can be increased.

The present invention thus provides a bonding device and a bonding method for joining three or more members including those made of dissimilar materials which allow the time required for the bonding process to be reduced, and the expenditure for the production facility to be reduced.

DESCRIPTION OF THE PREFERRED EMBODIMENT(S)

Figure 1:
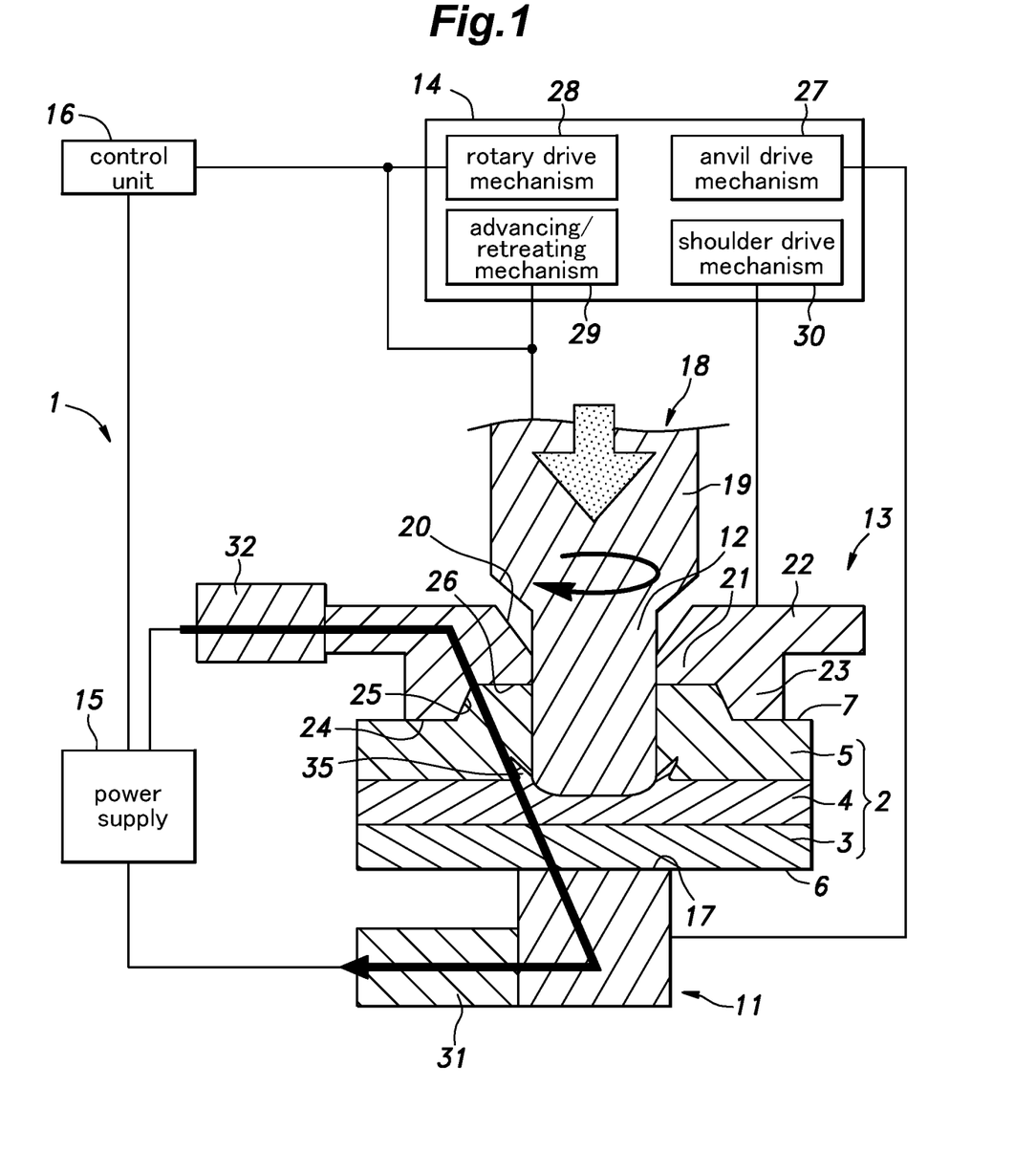
FIG. 1 is a vertical sectional view showing a bonding device according to a preferred embodiment of the present invention.

A preferred embodiment of the present invention will be described in the following with reference to the appended drawings. FIG. 1 is a vertical sectional view of a bonding device 1 according to a preferred embodiment of the present invention along with a laminated assembly 2 which is processed by the bonding device 1. In the following description, the laminated assembly 2 extends along a horizontal plane (major plane), and the bonding device 1 is applied downward to this laminated assembly 2 in the vertical direction, but this orientation is only exemplary, and the present invention may be applied to a workpiece oriented in any desired direction and from any desired direction, such as laterally, upwardly and obliquely without departing from the purview of the present invention.

The laminated assembly 2 includes a first member 3, an intermediate member 4, and a second member 5 which all consist of electroconductive plate members, and are layered in this order on a horizontal major plane. The laminated assembly 2 has a first surface 6 provided by the lower surface of the first member 3 (the lowermost layer) and a second surface 7 provided by the upper surface of the second member 5 (the uppermost layer). In an alternate embodiment, the laminated assembly 2 further includes an additional member on the lower side of the first member 3 which is made of the same or a similar material as the first member 3.

In this embodiment, the first member 3 and the intermediate member 4 are made of a same material or similar materials while the second member 5 is made of a different or dissimilar material from the first member 3 and the intermediate member 4. The material of the first member 3 and the intermediate member 4 has a higher strength and higher electrical resistance than the material of the second member 5. For example, the first member 3 and the intermediate member 4 may consist of an iron alloy (steel) while the second member 5 consists an aluminum alloy, a magnesium alloy, or a copper alloy. Alternatively, the first member 3 and the intermediate member 4 may consist of a titanium alloy while the second member 5 consists an aluminum alloy, a magnesium alloy, or a copper alloy. Further, the first member 3 and the intermediate member 4 may consist of an aluminum alloy while the second member 5 consists a copper alloy.

The bonding device 1 includes an anvil 11 configured to support the first surface 6 of the laminated assembly 2, a probe 12 positioned above the anvil 11, an annular shoulder member 13 positioned above the anvil 11 and surrounding the probe 12, a drive mechanism 14 for driving the anvil 11, the probe 12, and the shoulder member 13 as will be described hereinafter, a power supply 15 for conducting electric current between the shoulder member 13 and the anvil 11 that interpose the laminated assembly 2 therebetween, and a control unit 16 that controls the operation of the drive mechanism 14 and the power supply 15.

The anvil 11 is made of an electroconductive material, and has an anvil contact surface 17 that abuts on the first surface 6 of the laminated assembly 2.

The probe 12 is provided in a free end (lower end) part of a rotatable member 18 which is rotatable around a central axial line and has a rotationally symmetric shape around the central axial line. The probe 12 extends along the central axial line and preferably has a cylindrical shape which has a smaller diameter than a base end part 19 of the rotatable member 18. The probe 12 is made of a hard material such as steel, ceramic, cemented carbide, or the like.

As shown in FIG. 1, the shoulder member 13 has a rotationally symmetric shape around the central axial line. The shoulder member 13 has a probe support portion 21 having a through hole 20 centered on the central axial line, a flange 22 extending radially outward from the probe support portion 21, and an annular side wall portion 23 projecting downward from the lower surface of the probe support portion 21 concentrically to the central axial line. The probe 12 is passed through the through hole 20. The upper end of the through hole 20 is formed as a countersink in a conical shape. The inner diameter of the lower part (main part) of the through hole 20 is slightly larger than the outer diameter of the probe 12, and when the probe 12 rotates around the central axial line, the inner peripheral surface of the through hole 20 may be in sliding contact with the outer peripheral surface of the probe 12. The inner diameter of the side wall portion 23 is substantially larger than the outer diameter of the probe 12 so that the inner peripheral surface of the side wall portion 23 is concentrically separated from the outer peripheral surface of the probe 12. The inner peripheral surface of the side wall portion 23 may be flared toward the lower end thereof in a conical shape, but may also be substantially parallel to the axial direction. The lower surface of the side wall portion 23 forms a shoulder contact surface 24 that may abut on the second surface 7 of the laminated assembly 2. Thus, a recess 25 is defined by the lower surface of the probe support portion 21 opposing the second surface 7 of the laminated assembly 2, and the inner peripheral surface of the side wall portion 23, and the recess 25 is recessed relative to the shoulder contact surface 24. The shoulder member 13 may be made of a hard material such as a copper alloy (chromium copper, alumina-dispersed copper, tungsten copper alloy, etc.), a conductive ceramic, a cemented carbide, or the like.

As shown in FIG. 1, the drive mechanism 14 includes an anvil drive mechanism 27 for vertically moving the anvil 11, a rotary drive mechanism 28 for rotating the rotatable member 18 that includes the probe 12 around the central axial line, an advance/retreat drive mechanism 29 for advancing/retreating the probe 12 along the central axial line, and a shoulder drive mechanism 30 for vertically moving the shoulder member 13.

The power supply 15 is electrically connected to a first terminal 31 and a second terminal 32. The first terminal 31 is electrically connected to the anvil 11, and the second terminal 32 is electrically connected to the shoulder member 13 (each via a sliding contact mechanism or a flexible cable). The anvil 11 is at least partly electrically conductive so that electric current can be supplied to the anvil contact surface 17 via the first terminal 31, and the shoulder member 13 is at least partly electrically conductive so that electric current can be supplied to the shoulder contact surface 24 via the second terminal 32.

The mode of operation of the bonding device 1 illustrated in FIG. 1 in processing the laminated assembly 2 will be described in the following with reference to FIGS. 6A to 6E.

Figure 6A:
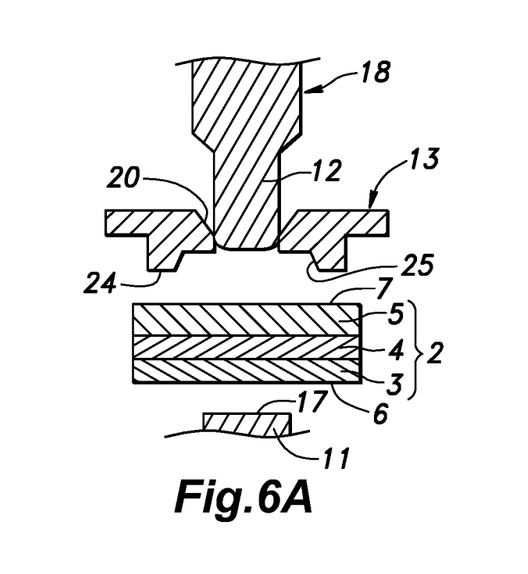
FIGS. 6A to 6E are diagrams illustrating different stages of a bonding method according to a preferred embodiment of the present invention.

As shown in FIG. 6A, the first member 3, the intermediate member 4, and the second member 5 are placed on the anvil 11, and the probe 12 and the shoulder member 13 are positioned above the second surface 7. The probe 12 and the shoulder member 13 are moved downward so as to press the laminated assembly 2 against the anvil 11 by using the drive mechanism 14 under the control of the control unit 16 in preparation for the friction stirring spot bonding and the resistance spot welding to be performed as will be described in the following.

Figure 6B:
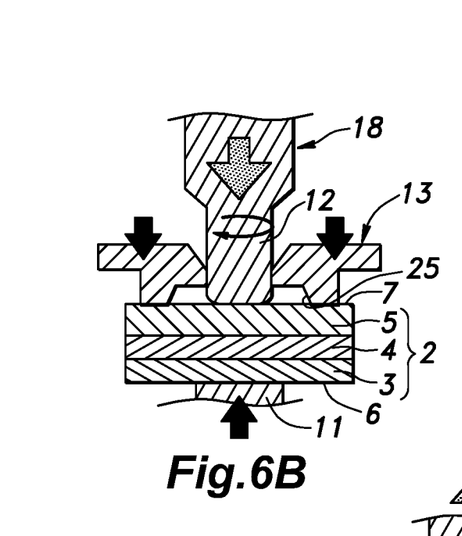

As shown in FIG. 6B, the anvil 11 presses the first surface 6 of the laminated assembly 2 from below, and the shoulder member 13 presses the second surface 7 of the laminated assembly 2 from above. While the laminated assembly 2 is pressed between the anvil 11 and the shoulder member 13, the probe 12 is rotated around the central axial line, and advanced into the laminated assembly 2 from the side of the second surface 7.

Figure 6C:
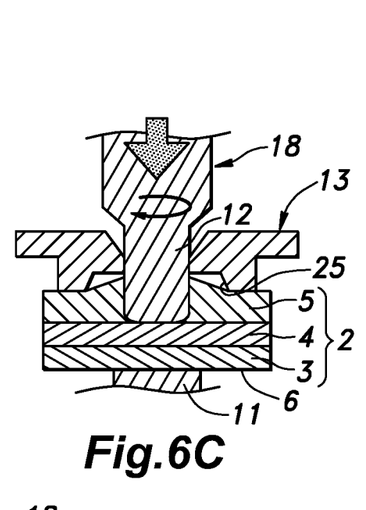

As shown in FIG. 6C, the tip of the probe 12 is plunged into the second member 5, and this causes the second member 5 to be deformed such that the material of the second member 5 pushed away therefrom is displaced into the recess 25 of the shoulder member 13. Owing to the frictional heat generated by the rotating probe 12, the material of the second member 5 surrounding the probe 12 becomes plastically fluid, and an annular plastically fluid region is generated around the probe 12. Once the tip of the probe 12 reaches the intermediate member 4, the control unit 16 causes electric current to flow between the shoulder member 13 and the anvil 11. The position of the tip of the probe 12 can be detected or managed by the downward stroke of the probe 12, the plunging pressure (plunging load) of the probe 12 into the laminated assembly 2, the rotational load of the probe 12, or any combination of the above.

Figure 6D:
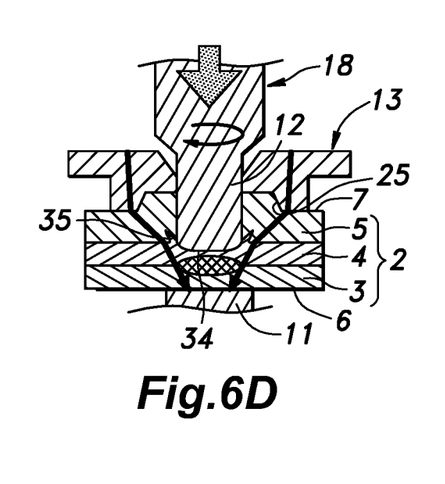

As shown in FIG. 6D, with electric current flowing between the shoulder member 13 and the anvil 11, the probe 12 is kept rotating and moved further downward, and the tip of the probe 12 plunges into the intermediate member 4. As a result, the resistance heat generated in the first member 3 and the intermediate member 4 and the frictional heat generated by the rotation of the probe 12 cause a molten region 34 to be generated in or between the first member 3 and the intermediate member 4. At the same time, a part of the material of the second member 5 and the intermediate member 4 in the vicinity of the probe 12 is caused to plastically flow. In particular, the part of the material that is pushed further away from the probe 12 is cooled and becomes comparatively less fluid, but is pushed away from the probe 12 under pressure from the more fluid part of the material. As a result, a hook 35 that projects radially outward and upward is created in the part of the intermediate member 4 surrounding the probe 12. The hook 35 thus has a crown shape flaring toward the front end (upper end) thereof, and obliquely extends into or wedge into the material of the second member 5.

Figure 6E:
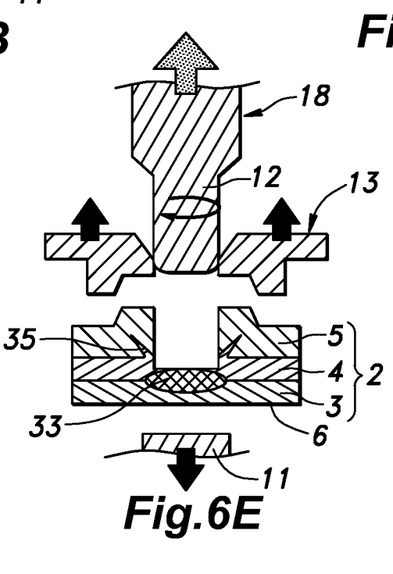

As shown in FIG. 6E, the control unit 16 (see FIG. 1) stops supplying the electric current between the shoulder member 13 and the anvil 11, and causes the probe 12 to retreat along the axial line while rotating. Further, the anvil 11 and the shoulder member 13 are moved away from the laminated assembly 2. When the current is stopped and the probe 12 is moved away, the molten region 34 (see FIG. 6D) solidifies to form a nugget 33 which firmly joins the first member 3 and the intermediate member 4 to each other. Further, since the hook 35 is formed in the second member 5 and the intermediate member 4 that have been plastically flowed by the rotation of the probe 12, the second member 5 and the intermediate member 4 are also firmly joined to each other.

Figure 7A:
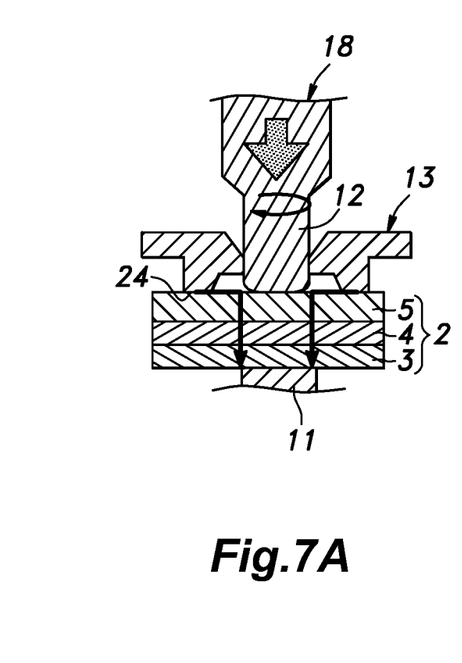
FIGS. 7A to 7C are diagrams illustrating different stages of a bonding method according to a modified embodiment of the present invention.
Figure 7B:
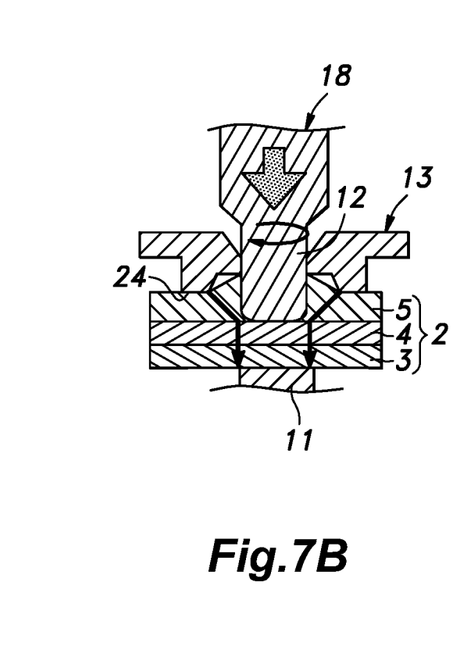
Figure 7C:
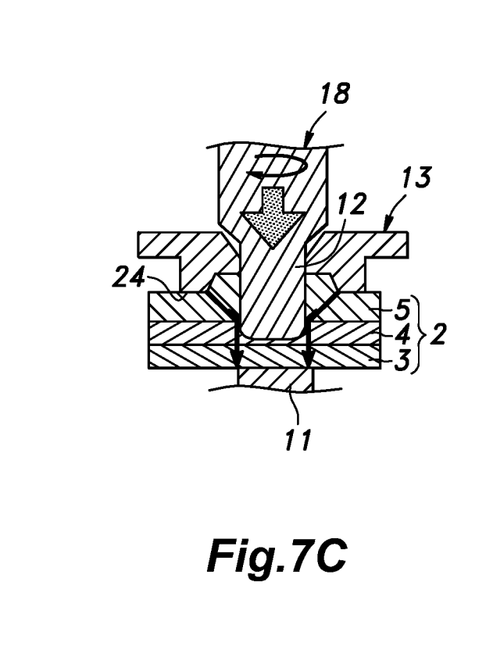

FIGS. 7A to 7C show a bonding process that is performed by using the bonding device 1 shown in FIG. 1 in a slightly different manner from that shown in FIGS. 6A to 6E. In this case, as shown in FIG. 7A, electric current is supplied between the shoulder member 13 and the anvil 11 before or at the same time as the tip of the probe 12 comes into contact with the second surface 7 of the laminated assembly 2. Since the resistance heat generated by the electric current is generated over a wider range of the laminated assembly 2 (a region of the second member 5 adjoining the probe 12 and the shoulder member 13), and the part of the second member 5 softened by the resistance heat increases in size so that the probe 12 can be plunged into the laminated assembly with a smaller resistance and/or at a higher speed.

When the supply of electric current is started immediately before the tip of the probe 12 reaches the intermediate member 4 of the laminated assembly 2 as shown in FIG. 7B, the resistance heat softens the part of the second member ranging from the outer periphery of the probe (from which the hook 35 generated to the shoulder contact surface 24) so that the tip of the hook 35 can be guided radially outward (for a better anchoring effect of the hook 35). Furthermore, the part of the intermediate member 4 directly above the anvil 11 is actively softened so that the hook 35 is generated in an active manner, and the softened material is prevented from flowing into the interface between the first member 3 and the intermediate member 4. FIG. 7C shows a case where the supply of electric current is started when the tip of the probe 12 has advanced beyond the interface between the second member 5 and the intermediate member 4. In this case also, the advantaged gained by the embodiment shown in FIG. 7B can be similarly gained.

Figure 2:
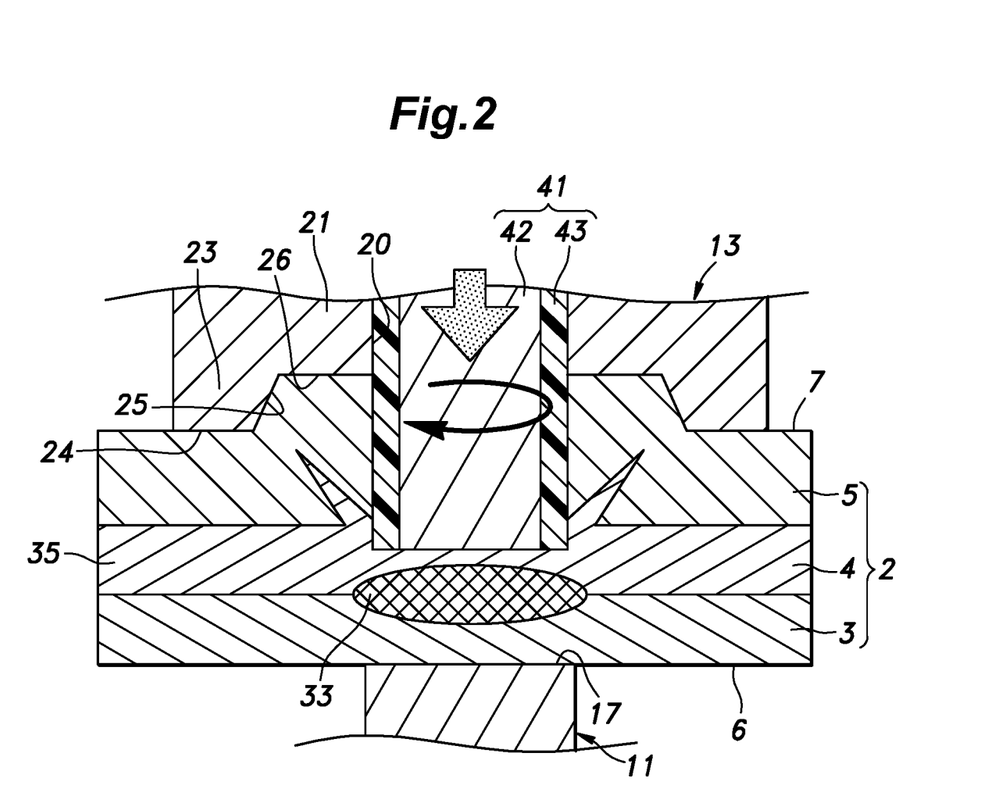
FIG. 2 is a fragmentary vertical sectional view showing a modified example of the probe of the bonding device according to the present invention.

FIG. 2 shows a modified embodiment of the present invention which differs from that shown in FIG. 1 in the structure of the probe 12. In the description of this modification, the corresponding parts are denoted with like numerals without necessarily repeating the description of such parts to avoid redundancy. In the modified embodiment shown in FIG. 2, the probe 41 extends along the central axial line and has a cylindrical shape similarly as that of the embodiment shown in FIG. 1, but differs therefrom by including a probe conductive part 42, and a probe insulating part 43 made of electrically insulating material. The probe 41 is in sliding contact with the inner circumferential surface of the through hole 20 of the shoulder member 13 at the outer circumferential surface of the probe insulating part 43. Therefore, electric current is prevented from flowing between the probe 41 and the shoulder member 13 so that energy efficiency of the resistance welding can be improved.

Figure 3A:
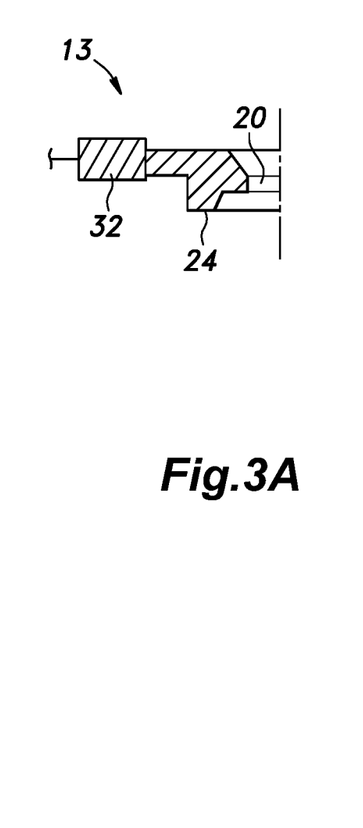
FIGS. 3A to 3D are fragmentary sectional views showing different embodiments of the shoulder member according to the present invention.
Figure 3B:
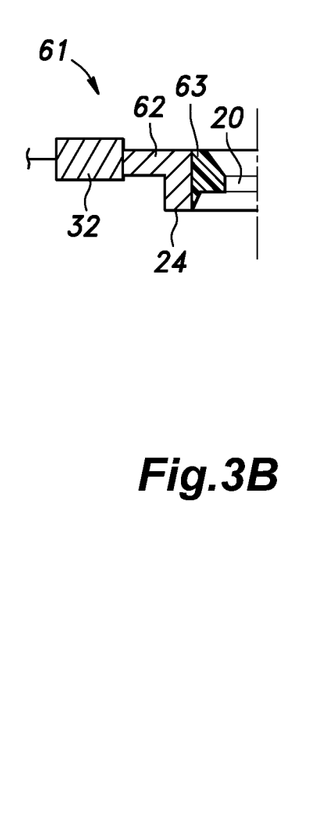
Figure 3C:
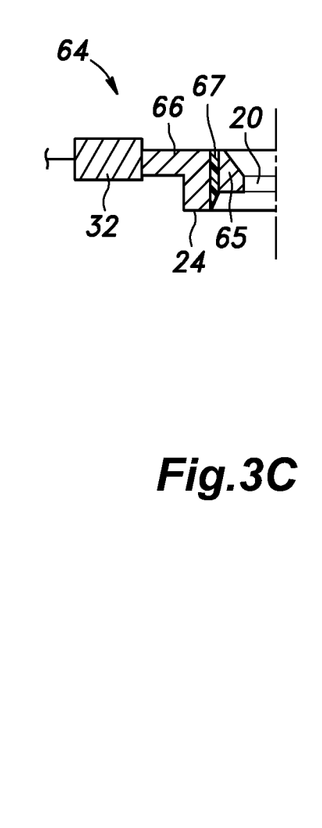

FIG. 3A shows the shoulder member 13 used in the embodiment shown in FIG. 1, and FIGS. 3B and 3C show different modifications thereof. The shoulder member 13 shown in FIG. 3A is entirely made of electroconductive material. In the case of the shoulder member 61 shown in FIG. 3B, the outer peripheral part 62 thereof including the flange 22 and the annular side wall portion 23 is made of electroconductive material, and the central ring part 63 thereof including the probe support portion 21 formed with the through hole 20 is made of electrically insulating material. The second terminal 32 is in sliding contact with the outer circumferential surface of the flange 22 which is electroconductive, and the probe 12 is electrically insulated from the flange 22 by the probe support portion 21.

In the case of the shoulder member 64 shown in FIG. 3C, the outer peripheral part 66 thereof including the flange 22 and the annular side wall portion 23 is made of electroconductive material, and the central part thereof including the probe support portion 21 formed with the through hole 20 includes an outer ring part 67 made of electrically insulating material, and an inner ring part 65 made of electroconductive material. Thus, the inner ring part 65 defining the through hole 20 is made of electroconductive material such as metallic material, but the inner ring part 65 is electrically insulated from the outer peripheral part 66 of the shoulder member 64 by the outer ring part 67. The second terminal 32 is again in sliding contact with the outer circumferential surface of the flange 22 which is electroconductive, and the probe 12 is electrically insulated from the flange 22 by the outer ring part 67 of the probe support portion 21.

Figure 3D:
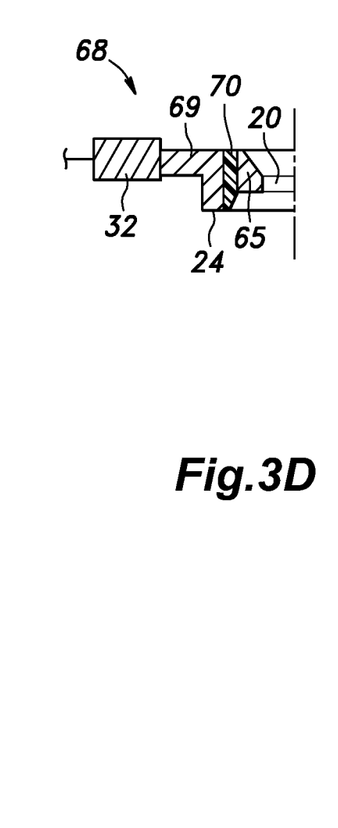

The shoulder member 68 shown in FIG. 3D is similar to that shown in FIG. 3C, and includes the outer peripheral part 69 thereof including the flange 22 and the annular side wall portion 23 is made of electroconductive material, and the central part thereof including the probe support portion 21 formed with the through hole 20 includes an outer ring part 70 made of electrically insulating material, and an inner ring part 65 made of electroconductive material. In this case, the outer ring part 70 has an increased radial thickness so as to account for a larger part of the annular side wall portion 23 so that the annular side wall portion 23 may be increased in rigidity and mechanical strength by suitably selecting the material of the outer ring part 70.

In the modified embodiments shown in FIGS. 2, 3A, 3B and 3C, the electroconductive parts may be made of a copper alloy (such as chromium copper, alumina-dispersed copper, tungsten copper alloy, etc.), electroconductive ceramic material, cemented carbide, or the like, and the electrically insulating parts may be made of insulating ceramic material, Bakelite (registered trademark) (phenol resin), mica, or the like.

Figure 4A:
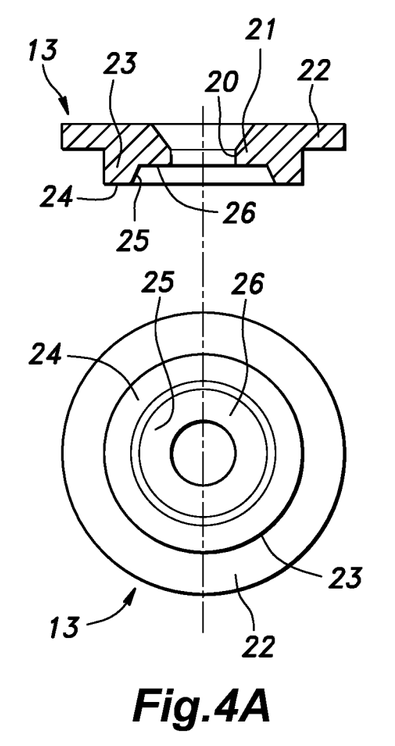
FIG. 4A shows the shoulder member of the bonding device illustrated in FIG. 1 in sectional view and plan view.

The friction stir bonding performed by the above-mentioned bonding device 1 is a friction stir spot bonding, and the shoulder contact surface 24 of the shoulder member 13 contributes to a favorable external appearance of the bonded spot. FIG. 4A shows the shoulder member 13 of the bonding device 1 shown in FIG. 1 in greater detail.

Figure 4B:
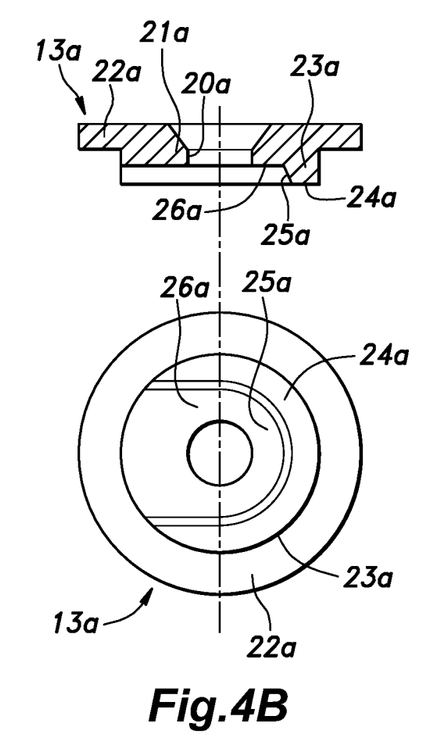
FIG. 4B show a modified shoulder member similarly illustrated as in FIG. 4A.

FIG. 4B shows an alternate embodiment of the shoulder member 13a. In FIG. 4B, the parts corresponding to those in FIG. 4A are denoted with like numerals each followed by letter "a". In this case, the side wall portion 23a is U shaped so that the recess 25a has an opening on one side defined by a pair of mutually parallel linear sections of the side wall portion 23a on the rear side of the shoulder member 13a with respect to the traveling direction of the shoulder member 13a relative to the laminated assembly 2 at the time of a line bonding. According to this embodiment, the laminated assembly 2 may be bonded along a line in a favorable manner by moving the laminated assembly 2 along a horizontal line relative to the bonding device 1 by using the bonding device 1 fitted with the shoulder member 13a shown in FIG. 4B. Even though the shoulder member 13 shown in FIG. 4A may be used for performing friction stir bonding along a line, but the embodiment shown in FIG. 4B is advantageous since the open side of the recess 25a allows the laminated assembly 2 to be moved relative to the bonding device 1 with a relatively small resistance. The side wall portion 23a may also consist of a pair of mutually parallel sections extending along the relative movement between the laminated assembly 2 and the bonding device 1.

FIGS. 5A to 5D show the different modes of current flow that depend on the configurations of the anvil 11. The arrows on these drawings indicate the flow of electric current. The anvil 11 and the probe 12 are normally cylindrical in shape, and are positioned in a coaxial relationship.

Figure 5A:
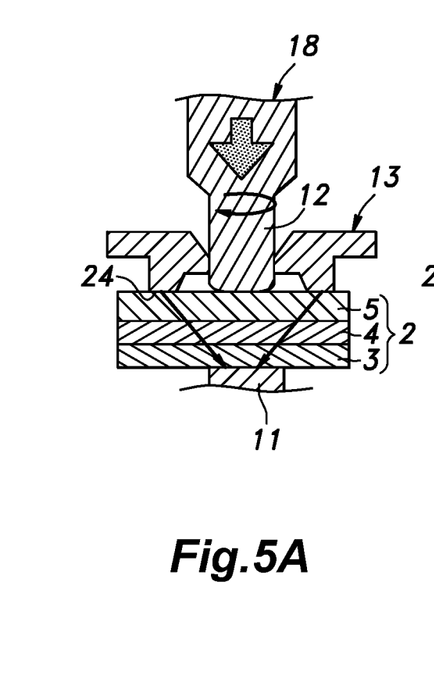
FIGS. 5A to 5D are sectional views of bonding devices provided with different examples of anvils.

The anvil 11 shown in FIG. 5A has a substantially same as or slightly greater diameter than the probe 12. Since the contact area between the laminated assembly 2 and the anvil 11 is relatively small, the laminated assembly 2 receives a relatively strong and stable pressure from the anvil 11, and the electric current flows through a relatively limited region of the laminated assembly 2.

Figure 5B:
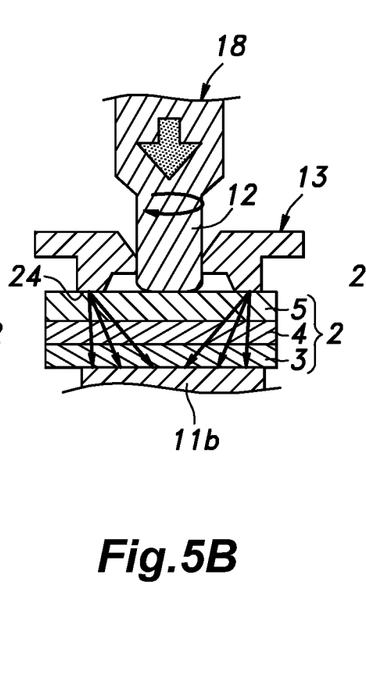

The anvil 11b shown in FIG. 5B has a comparatively large diameter which is between the inner diameter and the outer diameter of the shoulder contact surface 24 (the side wall portion 23). Since the electric current flows through a relatively large region (a relatively large radial range) of the laminated assembly 2, a relatively large nugget is 33 is produced.

Figure 5C:
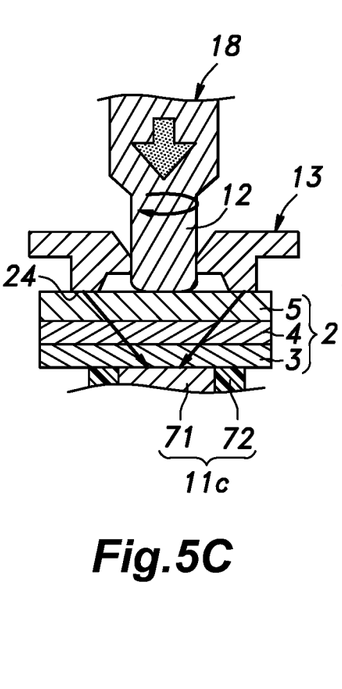

The anvil 11c shown in FIG. 5C includes a central part 71 and an outer peripheral part 72. The central part 71 is made of a more rigid or stiff material than the outer peripheral part 72. According to this embodiment, the deformation of the anvil 11c when pressed against the laminated assembly 2 can be reduced. The outer profile of the central part 71 may be greater than the inner profile of the shoulder contact surface 24.

Figure 5D:
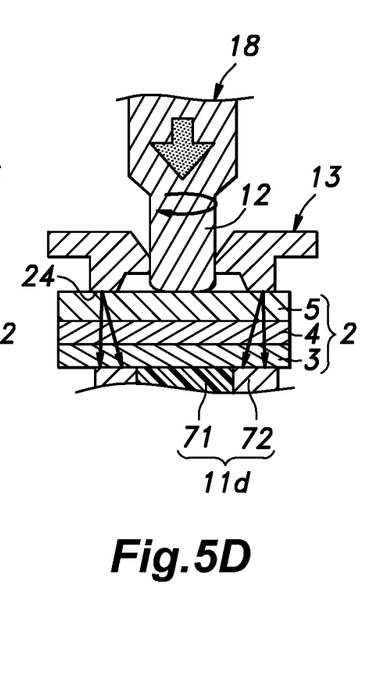

The anvil 11d shown in FIG. 5D includes a central part 71 and an outer peripheral part 72. The central part 71 is made of a less rigid or less stiff material than the outer peripheral part 72. According to this embodiment, the outer peripheral part 72 is preferentially pressed against the laminated assembly 2 so that the electric current flows preferentially through a radially outer region of the laminated assembly 2 (or an annular region surrounding the central axis).

Various features and advantages of the foregoing embodiments will be discussed in the following.

In the bonding device 1 described above, the anvil 11 and the probe 12 for friction stir bonding can serve as the electrodes for resistance spot welding, the cost and the size of the bonding device 1 can be minimized as compared to the case where a friction stir bonding device and a resistance spot welding device are individually employed. In particular, by using the bonding device 1 described above, the length of the manufacturing line can be reduced, and the amount of necessary investment can be reduced. Further, since friction stir bonding and resistance spot welding can be performed simultaneously, the time required for the manufacturing process can be reduced.

When dissimilar materials are resistance welded, highly brittle intermetallic compounds are often generated so that the desired bonding strength may not be achieved. In the foregoing embodiments, since the second member 5 and the intermediate member 4, which may be dissimilar materials, are joined by friction stir bonding instead of resistance welding, the bonding strength is prevented from being reduced by such intermetallic compounds.

In the foregoing embodiments, the friction heat created by the probe 12 in friction stir bonding the intermediate member 4 and the second member 5 contributes to the resistance welding of the intermediate member 4 and the first member 3, the energy consumption for the resistance welding can be reduced.

In resistance welding, it is known that the toughness of the nugget 33 may be reduced if the molten region 34 is too rapidly cooled. In the foregoing embodiments, since the probe 12 is kept rotating, and pulled out from the laminated assembly 2 after the supply of electric current for resistance welding is stopped, the frictional heat generated by the probe 12 is conducted to the molten region 34 so that the molten region 34 is prevented from being rapidly cooled, and the nugget 33 is prevented from being reduced in toughness.

In the embodiments shown in FIGS. 2, 3B and 3C, the probe 12 (41) is electrically insulated from the peripheral part of the shoulder member 13 which is connected to the power supply 15 via the second terminal 32. Therefore, electric safety measures for the bonding device 1 can be simplified. In the embodiment shown in FIGS. 3C, the shoulder member 68 includes the inner ring part 65 which may be electrically conductive, and may consist of highly wear resistant metallic materials.

The present invention has been described in terms of specific embodiments, but is not limited by such embodiments, and can be modified in various ways without departing from the scope of the present invention. The bonding between the second member and the intermediate member is not limited to resistance spot welding, but may also be other forms of resistance welding. Various features of various embodiments may be combined without departing from the scope of the present invention. For instance, the anvil shown in FIG. 5A to 5D may be combined with any of the shoulder members shown in FIG. 3, and the probes shown in FIGS. 1 and 2. The timing of supplying electric current between the shoulder member 13 and the anvil 11 (FIG. 6D) may coincide with the time point at which the probe 12 reaches the first member 3 or a short time after this timing. Thereby, a ring shaped nugget can be produced in stable manner so that the bonding strength can be improved.

The invention claimed is:

1. A bonding device for joining together a first member, an intermediate member, and a second member which are electroconductive, extend along a prescribed major plane, and are layered in this order as a laminated assembly, comprising:
   an anvil configured to support a first surface of the laminated assembly provided by the first member, and including an electroconductive part abutting against the first surface;
   a probe configured to rotate around a central axial line crossing the major plane and move toward and away from a second surface of the laminated assembly provided by the second member at a position corresponding to the anvil;
   a shoulder member having a shoulder contact surface configured to be pressed against the second surface, and a through hole configured to receive the probe, the shoulder member being at least partly electroconductive;
   a drive mechanism configured to rotate the probe around the central axial line and move the probe toward and away from the second member along the central axial line;
   an electric power supply electrically connected to the anvil and the shoulder member to conduct electric current through the laminated assembly via the anvil and the shoulder member; and
   a control unit for controlling operation of the drive mechanism and the electric power supply such that the first member and the intermediate member are joined to each other by resistance welding and the second member and the intermediate member are joined to each other by friction stir bonding.

2. The bonding device according to claim 1, wherein the probe includes an electrically conductive central part and an electrically insulating outer sleeve provided on an outer peripheral surface of the central part.

3. The bonding device according to claim 1, wherein the shoulder member includes a ring part surrounding the through hole made of an electrically insulating material and an outer peripheral part made of electrically conductive material.

4. The bonding device according to claim 1, wherein the shoulder member includes an inner ring part surrounding the through hole and made of electrically conductive material, an outer ring part surrounding the inner ring part and made of electrically insulating material, and an outer peripheral part made of electrically conductive material.

5. The bonding device according to claim 1, wherein the anvil is provided with an anvil contact surface configured to come into contact with the first surface of the laminated assembly, and the anvil contact surface has an outer peripheral contour which is located radially outward of an inner peripheral contour of the shoulder contact surface.

6. A bonding method for joining together a first member, an intermediate member, and a second member which are electroconductive, extend along a prescribed major plane, and are layered in this order as a laminated assembly by using the bonding device as defined in claim 1, comprising the steps of:
   abutting the anvil against the first surface of the laminated assembly, and the shoulder member against the second surface of the laminated assembly;
   pushing the probe via the through hole of the shoulder member into the laminated assembly from the second surface while rotating the probe around the central axial line by using the drive mechanism to join the second member and the intermediate member to each other by friction stir bonding, and conducting electric current through the laminated assembly between the shoulder member and the anvil by using the electric power supply to join the first member and the intermediate member to each other by resistance welding; and
   pulling the probe away from the laminated assembly via the through hole, wherein the first member and the intermediate members are made of similar materials, and the second member is made of a material dissimilar from the materials of the first member and the intermediate member.

7. The bonding method according to claim 6, wherein the first member and the intermediate members are made of similar materials, and the second member is made of a material dissimilar from the materials of the first member and the intermediate member, and the materials of the first member and the intermediate member are higher in mechanical strength and electric resistance than the material of the second member.

8. The bonding method according to claim 6, wherein electric current is started to be supplied between the shoulder member and the anvil before the probe reaches the intermediate member.

9. The bonding method according to claim 6, wherein electric current is started to be supplied between the shoulder member and the anvil substantially simultaneously as or after the probe reaches the intermediate member.

10. The bonding method according to claim 6, wherein electric current is started to be supplied between the shoulder member and the anvil substantially simultaneously as or after the probe reaches the first member.

* * * * *